United States Patent [19]

Guch, Jr.

[11] 4,429,394
[45] Jan. 31, 1984

[54] CONDUCTION COOLED SOLID STATE LASER
[75] Inventor: Steve Guch, Jr., Saratoga, Calif.
[73] Assignee: GTE Products Corporation, Stamford, Conn.
[21] Appl. No.: 319,838
[22] Filed: Nov. 9, 1981
[51] Int. Cl.³ .............................................. H01S 3/04
[52] U.S. Cl. ........................................ 372/34; 372/36; 372/72
[58] Field of Search ........................ 372/34, 35, 36, 72
[56] References Cited
U.S. PATENT DOCUMENTS 3,487,332 12/1969 Cordy .................................... 372/36
3,500,238 3/1970 Bazinet et al. ........................ 372/35
3,599,113 8/1971 Cremosnik ............................ 372/35
4,096,450 6/1978 Hill et al. .............................. 372/35

Primary Examiner—James W. Davie
Attorney, Agent, or Firm—John F. Lawler

[57] ABSTRACT

A conduction cooled solid state laser comprises a laser rod and a pump lamp within a pump cavity in a housing constituting a heat sink, the remote exterior surfaces of the rod and lamp being covered by highly reflective metal foils in intimate contact with those surfaces and backed by a thermally conductive material between the foil and housing that is selected to provide a tailored thermal impedance. The foil acts as a highly efficient reflector and as a thermal contact element between the heat source (rod or lamp) and backing material, the latter, in either solid or fluid form, being selected to provide the desired thermal impedance between the source and sink to optimize component temperatures. The optically reflective and the heat transfer functions of the pumping operation are essentially separate from each other, enabling selection of materials for these respective functions to enhance performance of the laser and substantially simplify its construction.

9 Claims, 4 Drawing Figures

CONDUCTION COOLED SOLID STATE LASER

BACKGROUND OF THE INVENTION

This invention relates to lasers and more particularly to conductively cooled optically pumped solid state lasers.

Laser rods and pump lamps of solid state lasers typically are cooled by liquids or gases flowing over their outer surfaces. Devices using liquid or gaseous cooling, however, are inherently complex and expensive. In addition, they have limited lifetimes due to coolant breakdown under intense ultraviolet radiation or normal wear of mechanical circulating system components. In addition, fluid cooling requires seals which complicate and increase the cost of construction, installation and maintenance of the laser assembly.

Other designs of solid state lasers use conduction cooling by connecting laser rods and lamps to heat sinks. Thermal contact in such designs is established by affixing the heat source (rod or lamp) to the sink by brazing, bonding or soldering the source to a heat sink member which generically exhibits limited pump light reflectivity. Such technique is described, for example, in U.S. Pat. No. 4,170,763. Another technique for establishing such thermal contact is pressing the heat source into, or otherwise surrounding it with a thermally-conductive medium such as a solid dielectric powder which provides heat transfer to a large heat sink. The problem with the foregoing conductively cooled systems is that they are not easily optimized. The reason is that materials having acceptable thermal and reflective properties cannot readily be optimized for both. Furthermore such materials cannot readily be brought into intimate contact with the heat/light sources over large cylindrical surface areas as required for efficient pumping and heat removal from cylindrical rods and lamps.

This invention is directed to a laser construction which overcomes these difficulties.

OBJECTS AND SUMMARY OF THE INVENTION

A general object of the invention is the provision of a solid state laser that is highly efficient in both optical pumping and in heat removal.

A further object is the provision of a conductively cooled optically pumped laser in which thermal impedance between the heat sources and the heat sink is selectively variable without affecting the efficiency of optical coupling between the lamp and laser rod.

A further object is the provision of such a laser that is simple in construction and easy to install and maintain.

These and other objects of the invention are achieved with a conductively cooled optically pumped laser in which remotely opposed external surface portions of the laser rod and pump lamp are each covered by a thin highly reflective highly thermally conductive layer or sheet backed by a thermally conductive material having a selected thermal conductivity and disposed in intimate contact with the layer and heat sink. The layer preferably is a malleable metal foil in intimate contact with the surface of the heat source (rod or lamp) and the conducting substance preferably is a metallic or other powder providing an efficient heat path between the foil and heat sink. The reflection and thermal conduction requirements of this laser are substantially completely separate from each other, permitting optimization of each for maximum efficiency in laser operation.

DESCRIPTION OF PREFERRED EMBODIMENTS

Figure 1:
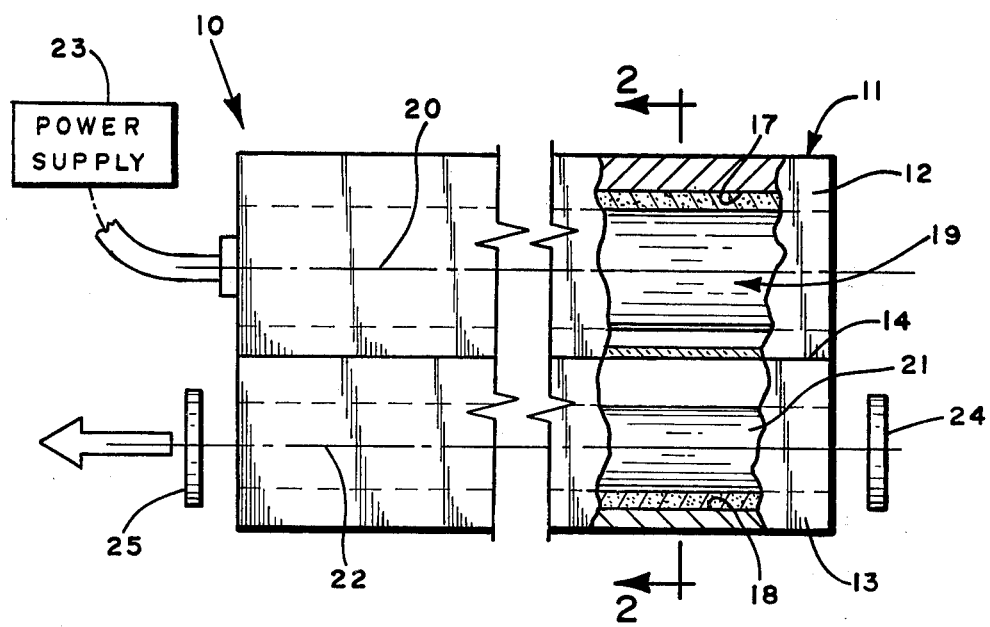
FIG. 1 is a schematic elevation partly in section of a laser embodying this invention.
Figure 2:
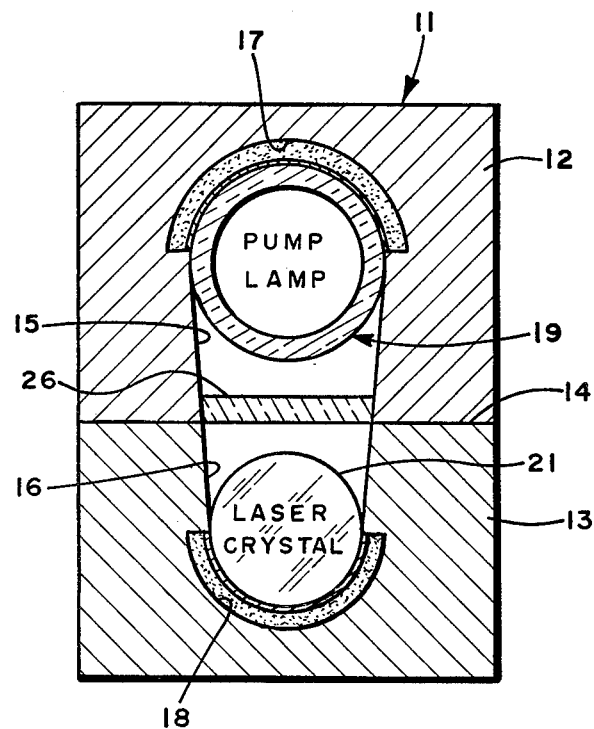
FIG. 2 is an enlarged transverse section taken on line 2—2 of FIG. 1.
Figure 3:
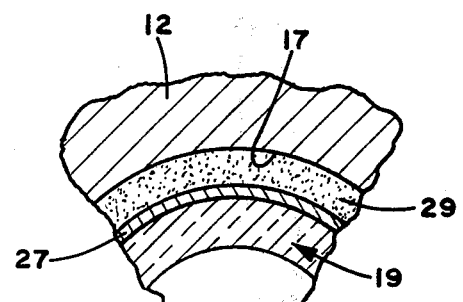
FIGS. 3 and 4 are greatly enlarged portions of FIG. 2 showing details of construction.
Figure 4:
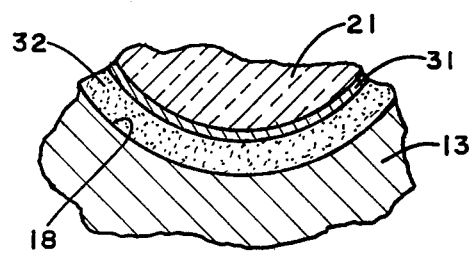

Referring now to the drawings, a laser 10 embodying this invention is shown in FIGS. 1 and 2 and comprises an elongated split housing 11 constituting a heat sink and having first and second sections 12 and 13 joined together along plane 14. Sections 12 and 13 have elongated recesses 15 and 16, respectively, which together form the laser pump cavity and which have semicylindrical enlarged portions 17 and 18, respectively, at opposite ends. A cylindrical lamp 19 having an axis 20 is disposed in recess 15 adjacent to and coaxial with enlarged portion 17 and a cylindrical rod 21 comprising the laser crystal having an axis 22 is similarly disposed in recess 16 coextensive with and parallel to rod 21 and coaxial with enlarged portion 18. A power supply 23 connected to lamp 19 energizes it for optically pumping laser rod 21.

A totally reflective mirror 24 and a partially transmissive mirror 25 are spaced from opposite ends, respectively, of laser rod 21 along axis 22 and form the optical cavity of the laser, the coherent light output of which is indicated by the arrow.

In order to reduce or eliminate unwanted radiation components from lamp 19 to laser rod 21, and optical filter 26 is disposed in recess 15 between and coextensive with lamp 19 and rod 21.

In accordance with this invention, a thin, highly reflective, highly thermally conductive sheet or layer 27, such as a foil of aluminum, gold or the like or a metallic coating, is brought into intimate contact with or deposited on the upper (as viewed) half external surface of lamp 19 remote from rod 21. Enlarged portion 17 of recess 15 is adjacent to the foil-backed portion of lamp 19 and defines therewith an arcuate semi-cylindrical space which is filled with a material 29 selected to have a desired thermal conductivity. If high thermal conductivity is desired, for example, powder, chips, granules or the like of copper, silver, or gold may be used. If higher thermal impedance is appropriate a dielectric powder such as magnesium oxide or barium sulfate may be used. Foil 27 preferably is tightly pressed against the outer surface of lamp 19 to minimize or eliminate entrapment of air between lamp surface and foil and thus minimize thermal impedance between these parts. Material 29 is tightly packed between foil 27 and housing section 12 so that the thermal impedance between these parts is substantially that of material 29.

Laser rod 21 is similarly covered over its lower (as viewed) half portion by a foil or coating 31 backed by a material 32 pre-selected to have the desired thermal conductivity and tightly packed in enlarged portion 18 of recess 16.

In operation, light generated by lamp 19 which is incident on foil 27 is reflected by the foil and is either directly absorbed by crystal 21 or is re-reflected by foil 31 into laser crystal 21 since the reflection coefficient of such foil is very high. Aluminum foil, for example, has a reflection coefficient in excess of 90%. In addition the thermal conductivity of such foil is extremely high, i.e., 2.38 watts/cm/K, and accordingly heat generated by the pump lamp and laser crystal is transmitted with minimum thermal impedance by foils 27 and 31 to materials 29 and 32, respectively, and to the housing sections 12 and 13 as determined by the thermal conductivity of the material. In most cases, highly thermally conductive substances 29 and 32 are preferred for maximum transmission of heat from the heat sink. In the event it is desired to operate the laser at relatively elevated temperatures, however, as in the case of vibronic lasers described in my copending application Ser. No. 258,110, material 29 and 32 having a lower thermal conductivity coefficient is used and thus provides higher impedance to accomplish this result.

A laser embodying the invention and having the following physical characteristics was constructed and successfully operated:

Laser rod 21
    Crystal: alexandrite
    Diameter: 2.3 mm
    Length: 40 mm
    Shape: cylindrical
Lamp 19
    Type: Xenon flashlamp
    Outside diameter: 5 mm
    Pressure: 400 torr
    Arc length: 37.5 mm
    Shape: cylindrical
Layer 27/31: aluminum foil
Material 29/32: air
Rod operating temperature: 34° C. to 310° C.

What is claimed is:

1. A conductively cooled laser assembly comprising
a housing constituting a heat sink having an elongated pump cavity and comprising first and second sections
a pump lamp in said cavity within said first section,
a laser crystal in said cavity within said second section,
a totally reflective element and a partially transmissive element adjacent to opposite ends, respectively, of said crystal and defining therebetween the laser cavity,
thin optically reflective thermally conductive layers engaging the exterior surfaces, respectively, of said lamp and said crystal adjacent to said housing, and
thermally conductive material separate from said layer and said housing packed between and in engagement with each of said layers and said housing whereby heat from said lamp and said crystal is transmitted through said layers and said material to said housing.

2. A conductively cooled laser assembly comprising
a housing constituting a heat sink having an elongated pump cavity and comprising first and second sections
pump lamp means in said cavity within said first section,
laser crystal means in said cavity within said second section,
a totally reflective element and a partially transmissive element adjacent to opposite ends, respectively, of said crystal means and defining therebetween the laser cavity,
a thin optically reflective thermally conductive layer engaging the exterior surface of each of said means adjacent to said housing, and
thermally conductive material separate from said layer and said housing packed between and in engagement with said layer and said housing whereby heat from said one means is transmitted through said layer and said material to said housing.

3. A conductively cooled laser assembly comprising
an elongated housing constituting a heat sink having a cavity and comprising first and second sections,
a laser crystal in said cavity within said first section,
a pump lamp in said cavity within said second section,
a totally reflective element and a partially transmissive element adjacent to opposite ends, respectively, of said crystal and defining therebetween the laser cavity,
a first thin highly reflective highly thermally conductive layer engaging the exterior of said crystal adjacent to said housing,
a second thin highly reflective highly thermally conductive layer engaging the exterior of said lamp adjacent to said housing,
a first space between said first layer and said housing,
a second space between said second layer and said housing, and
a separate material having a predetermined thermal conductivity packed in each of said spaces in engagement with said lamp and crystal for transmitting heat from said lamp and said crystal to said housing.

4. The assembly according to claim 3 in which said layer comprises metallic foil.

5. The assembly according to claim 4 in which said layer comprises aluminum foil.

6. The assembly according to claim 3 in which said layer is a metallic coating.

7. The assembly according to claim 3 in which said material comprises discrete particles.

8. The assembly according to claim 7 in which said particles are metallic.

9. The assembly according to claim 3 in which said crystal and said lamp are cylindrical, said layers being semi-cylindrical and on opposite sides, respectively of said crystal and said lamp.

* * * * *